R. A. & J. H. THOMPSON.
HEADER REEL.
APPLICATION FILED FEB. 8, 1916.

1,196,615.

Patented Aug. 29, 1916.
2 SHEETS—SHEET 1.

Witnesses
Fenton N Belt
J W Sherwood

Inventors
R. A. Thompson and
J. H. Thompson
By Franklin H. Hough
Attorney

UNITED STATES PATENT OFFICE.

ROBERT A. THOMPSON AND JOHN H. THOMPSON, OF PLAINVILLE, KANSAS.

HEADER-REEL.

1,196,615.  Specification of Letters Patent.  Patented Aug. 29, 1916.

Application filed February 8, 1916. Serial No. 77,060.

*To all whom it may concern:*

Be it known that we, ROBERT A. THOMPSON and JOHN H. THOMPSON, citizens of the United States, residing at Plainville, in the county of Rooks and State of Kansas, have invented certain new and useful Improvements in Header-Reels; and we do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in header reels and it has for its object the provision of mechanism in connection with the reel whereby it may be quickly and easily moved either vertically or horizontally, the vertical movement serving to prevent its clogging which is sometimes a source of serious annoyance in the operation of harvester reels, the horizontal movement serving to adjust the position of the reel so as to best adapt it for use.

To these ends and to such others as the invention may pertain, the same consists in the novel arrangement, combination and adaptation of parts, all as will be more fully hereinafter described, shown in the accompanying drawings and then specifically defined in the appended claims.

Figure 1:
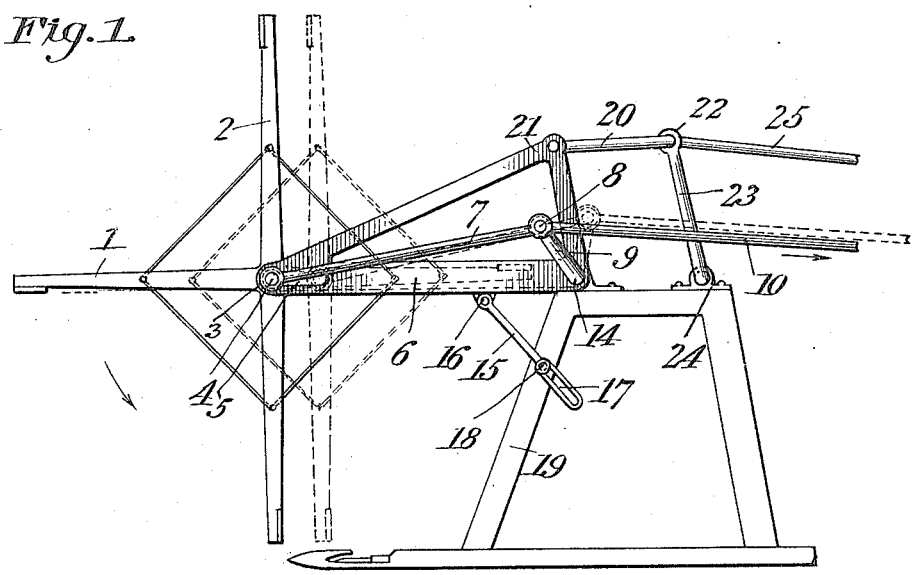
Figure 2:
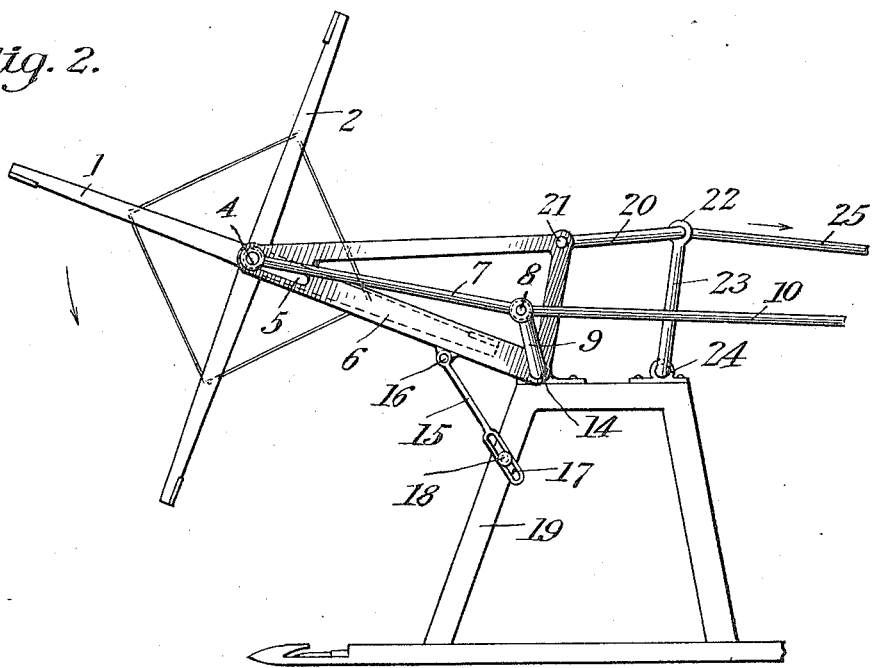
Figure 3:
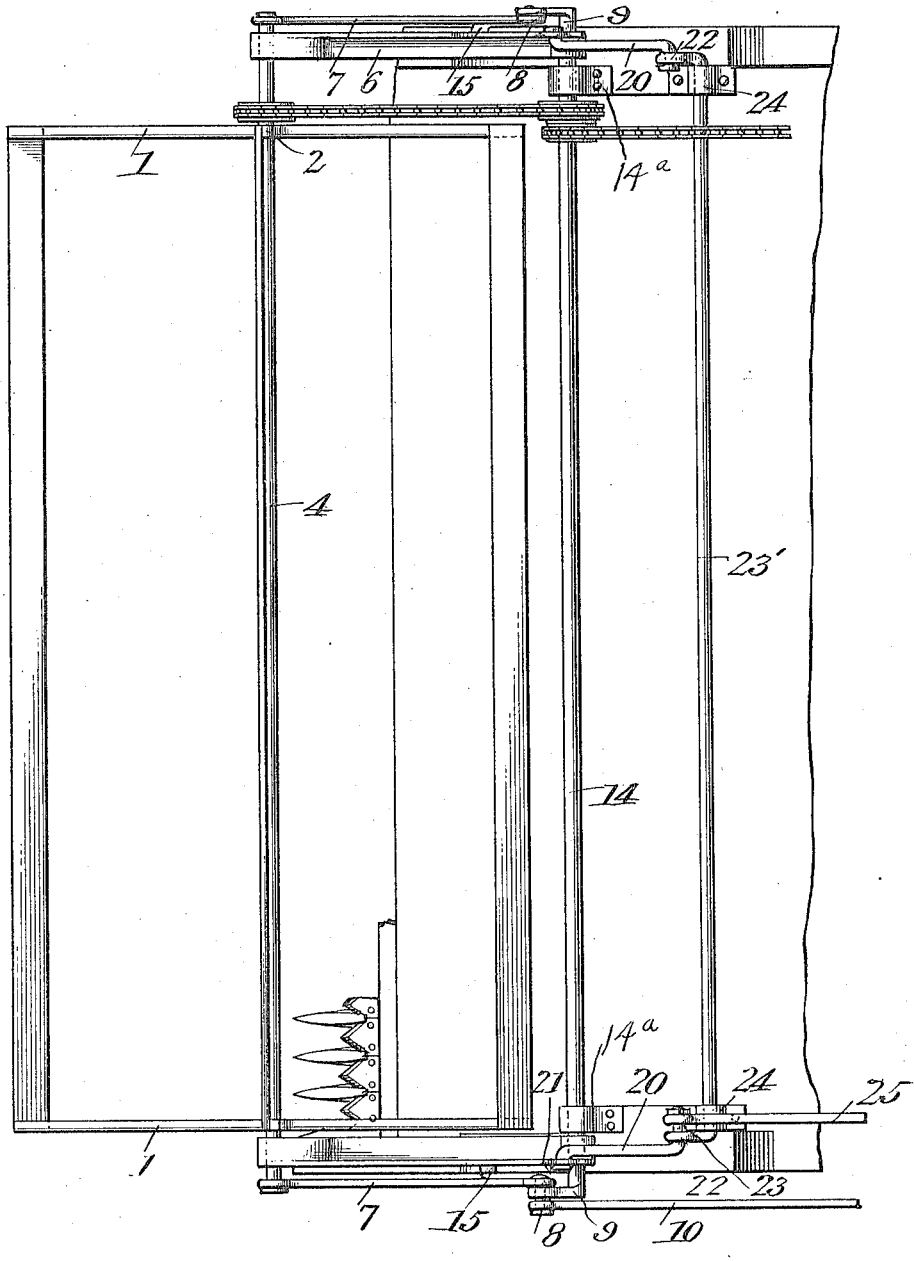

The invention is illustrated in the accompanying drawings, which, with the numerals of reference marked thereon, form a part of the specification and in which:

Figure 1 is a side elevation of a harvester reel with our invention applied thereto, the reel being shown in full lines in the position occupied when at its extreme outward movement and in dotted lines in its reverse position. Fig. 2 is a like view in which the reel is shown as at the upward extremity of its vertical adjustment. Fig. 3 is a top plan view of the reel showing its position relative to the cutter bar.

Reference now being had to the details of the drawings by numeral, 1 and 2 represent the arms of the reel which, at its center, is mounted upon and revoluble with a shaft 4, said shaft being passed through horizontal openings 5 provided at the outer end of the bracket reel support 6 upon opposite sides of the machine.

7, 7 designate rods at opposite ends of the reel, the forward ends of said rods being sleeved upon the shaft 4 and at their rear ends sleeved upon the stub shafts 8 at the free ends of the crank arms 9, 9. 10 is an operating rod also having the forward ends sleeved upon the stub shaft 8 at the free end of one of the crank arms 9, the said rod being extended rearwardly within a point conveniently accessible to the operator of the machine.

The bracket reel support 6 is triangular in form and its lower rear corner is sleeved upon the extended outer ends of the transverse shaft 14 mounted in suitable bearings 14$^a$, as seen in Fig. 3, and in bearings in the said reel support and is held in its adjusted position by a brace rod 15, one end of which brace rod has pivotal connection with the lower member of the supporting frame 16, while its other end, which is provided with a longitudinal opening 17, is sleeved upon a stub shaft or pintle 18 extending outwardly from the base arm 19 of the reel support.

20, 20 designate rods, each having one end pivotally connected with the upper rear corner 21 of one of the reel supporting brackets and its opposite end sleeved within an opening or eye 22 provided at the upper end of one of the rods 23. The rods 23 are carried by the shaft 23′ mounted in bearings in the brackets 24, as shown in Fig. 3.

25 designates a rod, one end of which is sleeved upon the extended outer end of one of the rods 20, the rod 25 extending rearwardly to a point conveniently accessible to the operator.

From the foregoing description, the operation of the invention will be at once evident. When, from any cause, it should be found desirable in order to free the reel from clogging, the operator by a movement of the rod 25 will raise the reel vertically, the rod moving rearwardly for this purpose, thus releasing it from engagement with the obstruction. When it may be found desirable to move the reel horizontally so as to increase or diminish its distance from the cutter bar, it will be noted that this result is obtained by a like movement imparted to the operating rod 10.

Having thus described our invention, what we claim to be new and desire to secure by Letters Patent is:

1. A harvester reel support comprising a frame, a rock shaft journaled therein, triangular slotted reel supporting bracket members journaled upon said shaft, said shaft having its ends bent to form crank arms projecting outside of said plates, a reel having spindle ends movable within slots in said bracket members, pivotal link connections between said crank arms and the spindle ends of the reel, a rod pivoted to one of said crank arms, a second rock shaft journaled upon the frame and terminating in crank arms, pivotal connection between the latter and the upper angled ends of the reel supporting bracket members, and rods connected to the crank arms on the second referred to rock shaft.

2. A harvester reel support comprising a frame, a rock shaft journaled therein, triangular slotted reel supporting bracket members journaled upon said shaft, said shaft having its ends bent to form crank arms projecting outside of said plates, a reel having spindle ends movable within slots in said bracket members, pivotal link connections between said crank arms and the spindle ends of the reel, a rod pivoted to one of said crank arms, a second rock shaft journaled upon the frame and terminating in crank arms, links having crank ends pivotally connecting the upper angled corners of the bracket supporting members and the cranks upon the second referred to rock shaft, and a rod having pivotal connection with one of the crank arms upon said links.

In testimony whereof we hereunto affix our signatures in presence of two witnesses.

ROBERT A. THOMPSON.
JOHN H. THOMPSON.

Witnesses:
W. F. HUGHES,
VIRNIE NORRIS.

Copies of this patent may be obtained for five cents each, by addressing the "Commissioner of Patents, Washington, D. C."